US010839791B2

(12) United States Patent
Ichikawa et al.

(10) Patent No.: US 10,839,791 B2
(45) Date of Patent: Nov. 17, 2020

(54) NEURAL NETWORK-BASED ACOUSTIC MODEL WITH SOFTENING TARGET-LAYER

(71) Applicant: INTERNATIONAL BUSINESS MACHINES CORPORATION, Armonk, NY (US)

(72) Inventors: Osamu Ichikawa, Yokohama (JP); Takashi Fukuda, Yokohama (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 204 days.

(21) Appl. No.: 16/019,676

(22) Filed: Jun. 27, 2018

(65) Prior Publication Data

US 2020/0005769 A1    Jan. 2, 2020

(51) Int. Cl.
    G10L 15/16    (2006.01)
    G06N 3/08     (2006.01)
    G10L 15/06    (2013.01)

(52) U.S. Cl.
    CPC ............... *G10L 15/16* (2013.01); *G06N 3/08* (2013.01); *G10L 15/063* (2013.01)

(58) Field of Classification Search
    CPC combination set(s) only.
    See application file for complete search history.

(56) References Cited

U.S. PATENT DOCUMENTS

| 8,260,733 | B2* | 9/2012 | Sullivan | G06N 3/084 |
| | | | | 706/21 |
| 9,460,711 | B1* | 10/2016 | Vanhoucke | G10L 15/063 |
| 9,654,830 | B2* | 5/2017 | Austin | H04N 21/4666 |
| 10,332,028 | B2* | 6/2019 | Talathi | G06F 11/34 |
| 10,490,182 | B1* | 11/2019 | Madhavaraj | G10L 15/183 |
| 10,559,225 | B1* | 2/2020 | Tao | G06N 3/0454 |
| 2013/0138436 | A1 | 5/2013 | Yu et al. | |
| 2016/0078339 | A1 | 3/2016 | Li et al. | |

(Continued)

OTHER PUBLICATIONS

Fukuda et al., "Efficient Knowledge Distillation from an Ensemble of Teachers", Interspeech 2017, Aug. 2017, pp. 3697-3701.

(Continued)

*Primary Examiner* — Linda Wong
(74) *Attorney, Agent, or Firm* — Tutunjian & Bitetto, P.C.; Randall Bluestone

(57) ABSTRACT

A method is provided for training a neural network-based (NN-based) acoustic model. The method includes receiving, by a processor, the neural network-based (NN-based) acoustic model, trained by a one-hot scheme and having an input layer, a set of middle layers, and an original output layer. At least each of the middle layers subsequent to a first one of the middle layers have trained parameters. The method further includes stacking, by the processor, a new output layer on the original output layer of the NN-based acoustic model to form a new NN-based acoustic model. The new output layer has a same size as the original output layer. The method also includes retraining, by the processor, only the new output layer and the original output layer of the new NN-based acoustic model in the one-hot scheme, with the trained parameters of middle layers subsequent to at least the first one being fixed.

18 Claims, 10 Drawing Sheets

(56) References Cited

U.S. PATENT DOCUMENTS

| | | | |
|---|---|---|---|
| 2016/0260428 A1* | 9/2016 | Matsuda | G06N 3/08 |
| 2017/0178666 A1* | 6/2017 | Yu | G10L 25/30 |
| 2017/0337918 A1 | 11/2017 | Xue et al. | |
| 2018/0047413 A1 | 2/2018 | Kurata | |
| 2018/0121798 A1* | 5/2018 | Barkan | G06F 16/00 |
| 2019/0205748 A1* | 7/2019 | Fukuda | G06N 3/08 |
| 2019/0378010 A1* | 12/2019 | Morris | G06Q 20/4016 |
| 2020/0134463 A1* | 4/2020 | Haidar | G06N 3/0472 |
| 2020/0193235 A1* | 6/2020 | Martinez-Canales | G06N 3/0481 |

OTHER PUBLICATIONS

Kurata et al., "Improved Neural Network Initialization by Grouping Context-Dependent Targets for Acoustic Modeling", Interspeech 2016, Sep. 2016, pp. 27-31.

Price et al., "Speaker Adaptation of Deep Neural Networks Using a Hierarchy of Output Layers", SLT 2014, Nov. 2014, pp. 153-158.

* cited by examiner

NEURAL NETWORK-BASED ACOUSTIC MODEL WITH SOFTENING TARGET-LAYER

BACKGROUND

Technical Field

The present invention generally relates to machine learning, and more particularly to a neural network-based acoustic model with a softening target-layer.

Description of the Related Art

In neural network acoustic modeling, networks are typically configured to include an input layer, followed by one or more "middle layers" that can include Fully Connected (FC) and/or convolutional layers, followed in turn by an output layer. Units in the output layer correspond to context-dependent phones (senones). Therefore, the size (i.e., the number of units) of the output layer is usually larger than the middle layers.

An acoustic model is traditionally trained in the one-hot scheme. Only one senone that corresponds to a correct senon (given by supervised information) is given a "1" as a target signal, and other senones are given "0"s as target signals.

However, senones are essentially a fine classification of phones by preceding and trailing phones. There are many similar phones. Therefore, when an acoustic model is used in testing, the actual output can never be one-hot, despite the fact that a one-hot scheme is used in training, thus resulting in an inconsistency between training and testing. Hence, there is a need for an improved approach to neural network acoustic modeling that addresses the aforementioned inconsistency between training and testing.

SUMMARY

According to an aspect of the present invention, a computer-implemented method is provided for training a neural network-based (NN-based) acoustic model. The method includes receiving, by a processor, the neural network-based (NN-based) acoustic model, trained by a one-hot scheme and having an input layer, a set of middle layers, and an original output layer. At least each of the middle layers subsequent to a first one of the middle layers have trained parameters. The method further includes stacking, by the processor, a new output layer on the original output layer of the NN-based acoustic model to form a new NN-based acoustic model. The new output layer has a same size as the original output layer. The method also includes retraining, by the processor, only the new output layer and the original output layer of the new NN-based acoustic model in the one-hot scheme, with the trained parameters of middle layers subsequent to at least the first one of the middle layers being fixed.

According to another aspect of the present invention, a computer program product is provided for training a neural network-based (NN-based) acoustic model. The computer program product includes a non-transitory computer readable storage medium having program instructions embodied therewith. The program instructions are executable by a computer to cause the computer to perform a method. The method includes receiving, by the processor, the neural network-based (NN-based) acoustic model, trained by a one-hot scheme and having an input layer, a set of middle layers, and an original output layer. At least each of the middle layers subsequent to a first one of the middle layers have trained parameters. The method further includes stacking, by the processor, a new output layer on the original output layer of the NN-based acoustic model to form a new NN-based acoustic model. The new output layer has a same size as the original output layer. The method also includes retraining, by the processor, only the new output layer and the original output layer of the new NN-based acoustic model in the one-hot scheme, with the trained parameters of middle layers subsequent to at least the first one of the middle layers being fixed.

According to yet another aspect of the present invention, a computer processing system is provided for training a neural network-based (NN-based) acoustic model. The computer processing system includes a memory for storing program code. The computer processing system further includes a processor, operatively coupled to the memory, for running the program code to receive the neural network-based (NN-based) acoustic model, trained by a one-hot scheme and having an input layer, a set of middle layers, and an original output layer. At least each of the middle layers subsequent to a first one of the middle layers has trained parameters. The processor further runs the program code to stack a new output layer on the original output layer of the NN-based acoustic model to form a new NN-based acoustic model. The new output layer has a same size as the original output layer. The processor also runs the program code to retrain only the new output layer and the original output layer of the new NN-based acoustic model in the one-hot scheme, with the trained parameters of middle layers subsequent to at least the first one of the middle layers being fixed.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a neural network-based acoustic model with a softening target-layer.

The present invention mitigates the inconsistency between training and testing involved by one-hot training. The inconsistency is mitigated without reliance on a conventional teacher-student based approach, thus obviating the need for a teacher model as required for conventional teacher-student based approaches typically used to address the aforementioned inconsistency.

In an embodiment, the present invention provides a solution that stacks another output layer on the output layer of a previously completed model, such that the additional output layer operates as a translation layer between a one-hot target and a soft target. Since the old output layer generates likelihood distributions, the new (additional) output layer can be trained to bridge between one-hot teacher and the likelihood distribution by the old output layer, thus reducing an error rate of the corresponding new model.

Figure 1:
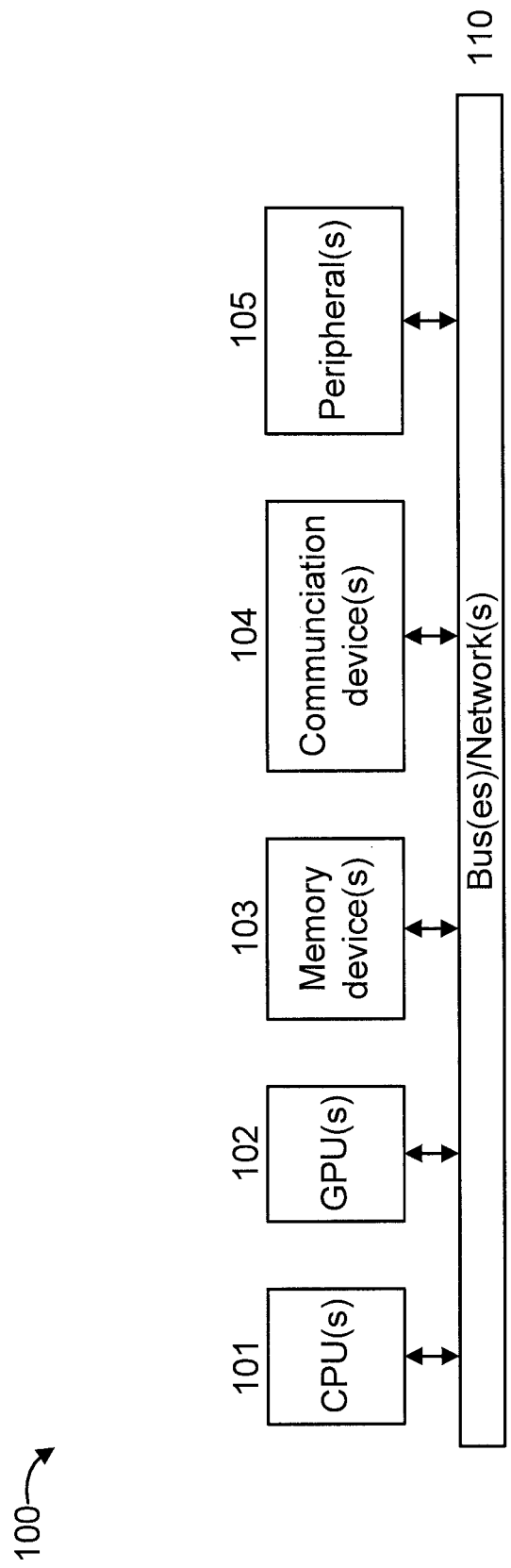
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 9-10). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
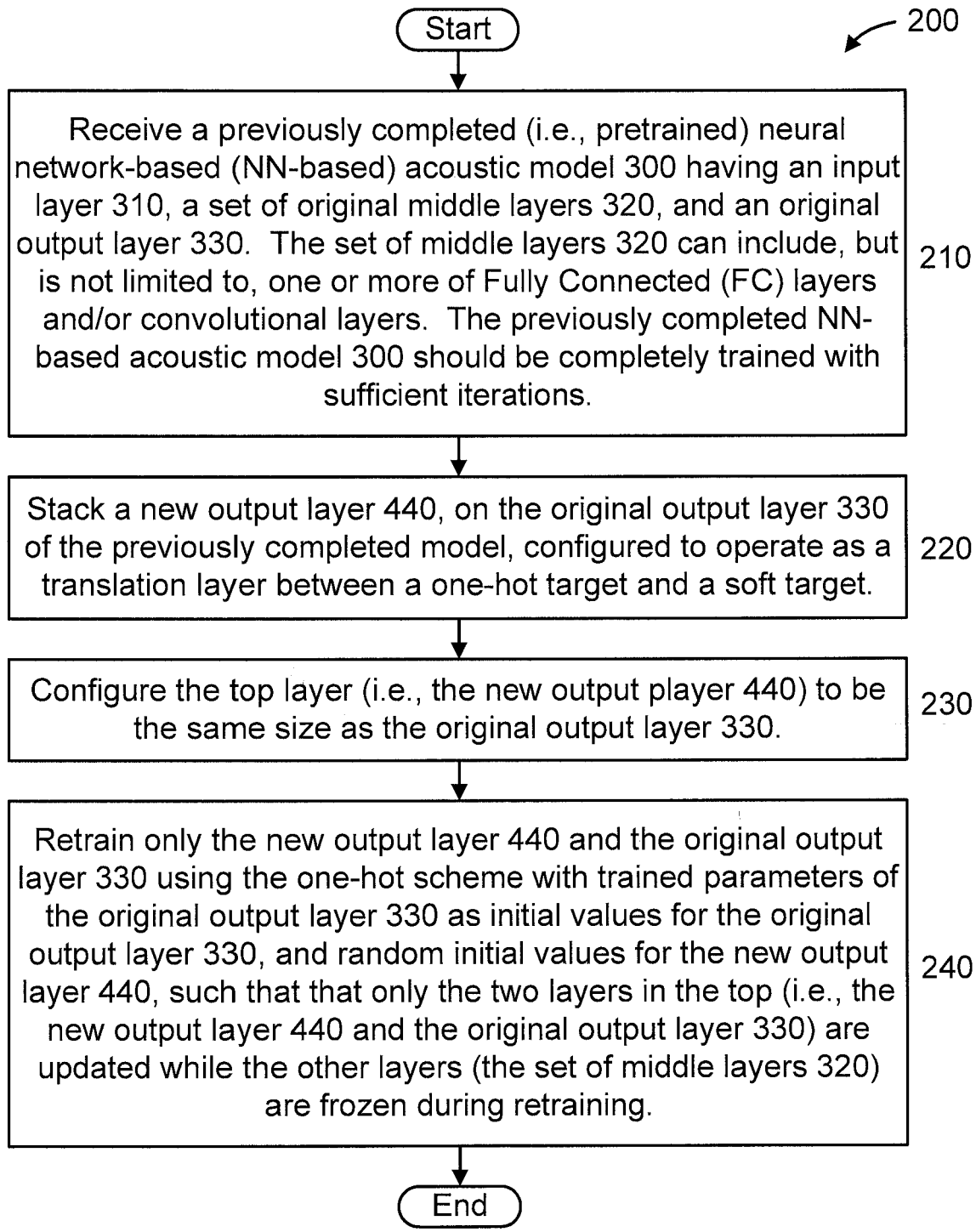
FIG. 2 is a flow diagram showing a method for training a neural network-based acoustic model using a one-hot scheme, in accordance with an embodiment of the present invention.

FIG. 2 is a flow diagram showing a method 200 for training a neural network-based acoustic model using a one-hot scheme, in accordance with an embodiment of the present invention.

Figure 3:
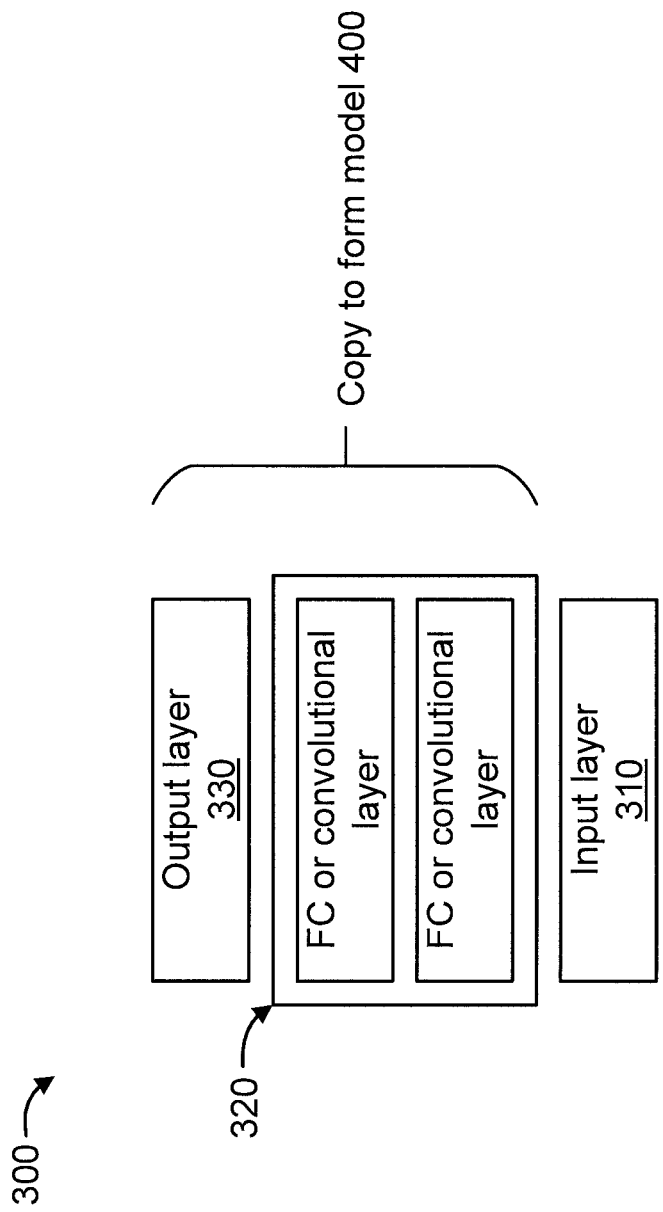
FIG. 3 is a block diagram showing a neural network-based acoustic model to which the present invention can be applied, in accordance with an embodiment of the present invention.

FIG. 3 is a block diagram showing a neural network-based acoustic model 300 to which the present invention can be applied, in accordance with an embodiment of the present invention. For example, method 200 can be applied to the neural network-based acoustic model 300 to obtain a new neural network based acoustic model 400 described with respect to FIG. 4. The model 300 can be built with one-hot teacher or some other pretraining technique. The model 300 should be built with one layer less than a target number of layers intended for the model 400 described with respect to FIG. 4, since the addition of a new output layer and the "rearrangement/reconfiguration" of the old output layer as the top-most middle layer in the new model 400 will result in the new model 400 being built with the target number of layers.

Figure 4:
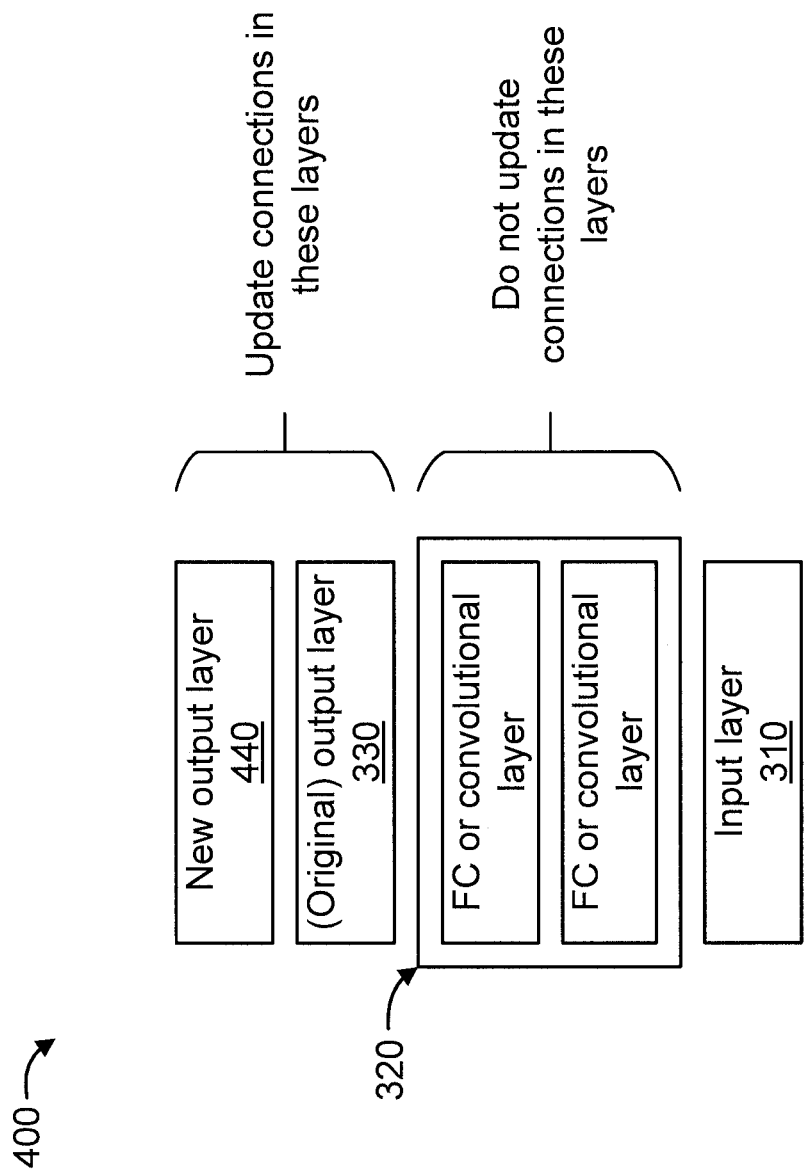
FIG. 4 is a block diagram showing a neural network-based acoustic model trained using the method of FIG. 2, in accordance with an embodiment of the present invention.

FIG. 4 is a block diagram showing a neural network-based acoustic model (aka the "new model") 400 trained using the method 200 of FIG. 2, in accordance with an embodiment of the present invention. In particular, FIG. 4 shows the neural-network based acoustic model 300 of FIG. 3 modified as per the method 200 of FIG. 2, in accordance with an embodiment of the present invention to form the new neural network-based acoustic model 400.

At block 210, receive a previously completed (i.e., pre-trained) neural network-based (NN-based) acoustic model 300 having an input layer 310, a set of original middle layers 320, and an original output layer 330. The set of middle layers 320 can include, but is not limited to, one or more of Fully Connected (FC) layers and/or convolutional layers. The previously completed NN-based acoustic model 300 used by the present invention should be completely trained with sufficient iterations.

In general, pretraining methods have been used to train NNs with deeply stacked layers efficiently. Discriminative pretraining is a typical example. Discriminative pretraining pretrains the layers step-by-step with a new middle layer inserted just under the output layer. Moreover, in discriminative pretraining, usually the two top layers are initialized with random values. In contrast, the present invention puts an additional output layer on top of the previous model (e.g., model 300), and only the top layer is initialized with random values. Hence, unlike the present invention, discriminative pretraining does not carry over the connection parameters in the output layer.

At block 220, stack a new output layer 440, on the original output layer 330 of the previously completed model, configured to operate as a translation layer between a one-hot target and a soft target. Accordingly, the translation layer reduces the inconstancy between one-hot training and testing by translating one-hot targets (in the original output layer 330) to soft targets (in the new output layer 440).

At block 230, configure the top layer (i.e., the new output player 440) to be the same size as the original output layer 330. As noted herein, in a conventional configuration, the output layer is larger (i.e., has more units) than the second layer from the top. The benefit of this new configuration resulting from block 230 is that the all layers can be copied from the previously completed model 300 to the new model 400 (aka "the final model" 400, which includes the new output layer 440) when discriminative pretraining is performed. That is, a new model 400 can be considered to be formed, in that the new model 400 includes a new output layer 440 (per block 220) having the same size (per block 230) as the previous output layer 330.

At block 240, retrain only the new output layer 440 and the original output layer 330 using the one-hot scheme with trained parameters of the original output layer 330 as initial values for the original output layer 330, and random initial values for the new output layer 440, such that that only the two layers in the top (i.e., the new output layer 440 and the original output layer 330) are updated while the other layers (the set of middle layers 320) are frozen during retraining. Hence, in a retraining session, only the connections in the new output layer 440 and the original output layer 330 are updated in the new model 400, while the connections in the set of middle layers 320 of the new model 400 are fixed and thus, not updated.

Figure 5:
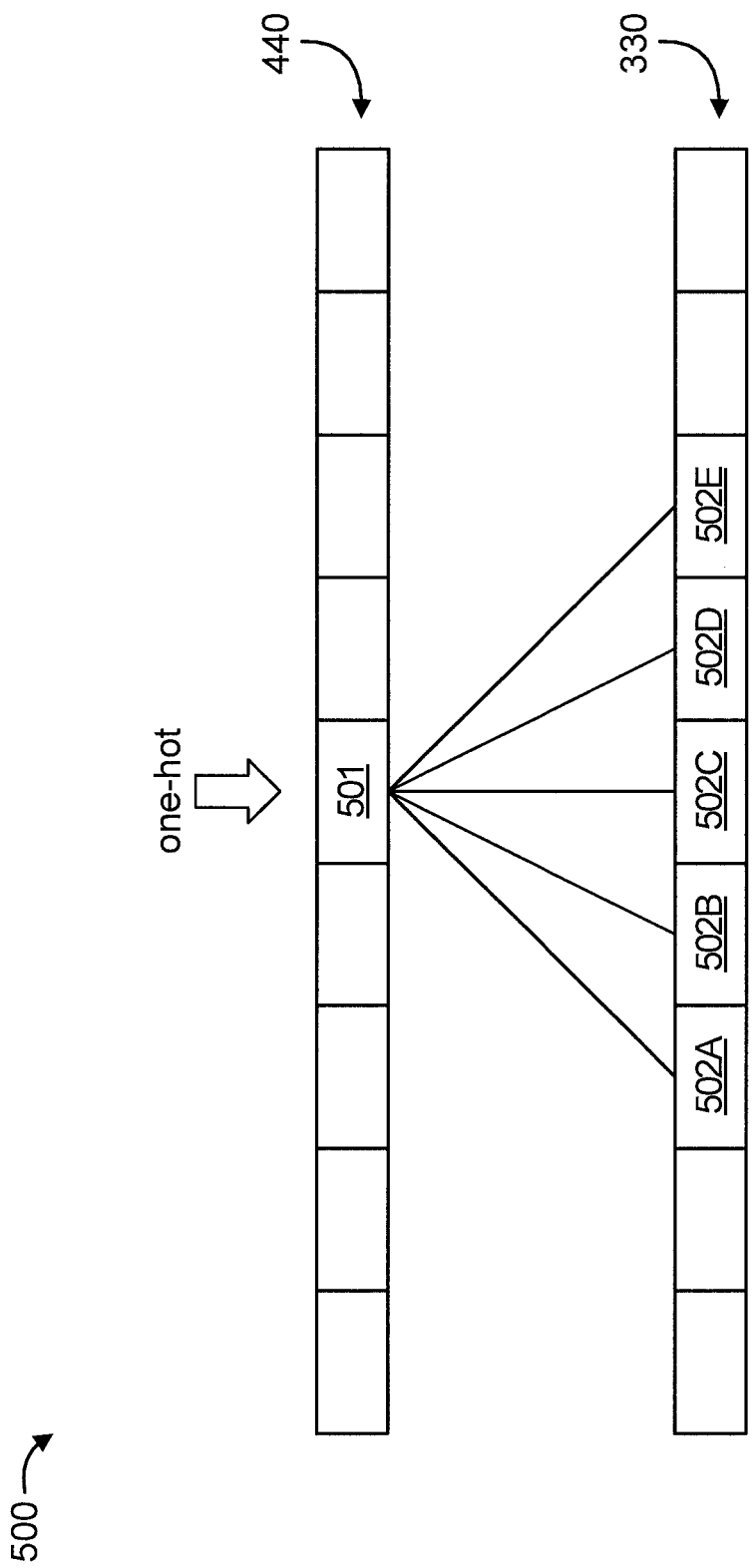
FIG. 5 is a block diagram showing interaction between the original output layer and the new output layer, in accordance with an embodiment of the present invention.

FIG. 5 is a block diagram showing interaction 500 between the original output layer 330 and the new output layer 440, in accordance with an embodiment of the present invention. Since the first model (300) is already trained, the second layer from the top outputs likelihood distributions (soft-labels) at an early state of the training iterations. The output layer 440 accepts soft-label-like data as an input and accepts one-hot data as a teacher. Thus, larger connection weights can be expected to be formed between one-hot correct senone (teacher) 501 and similar senones (input) 502A-E. Once the output layer 440 is trained, the second layer 330 from the top receives soft-label-like teacher through back-propagation. Since the layer 440 was trained with one-hot teacher before, layer 440 can be updated with the new teacher.

Figure 6:
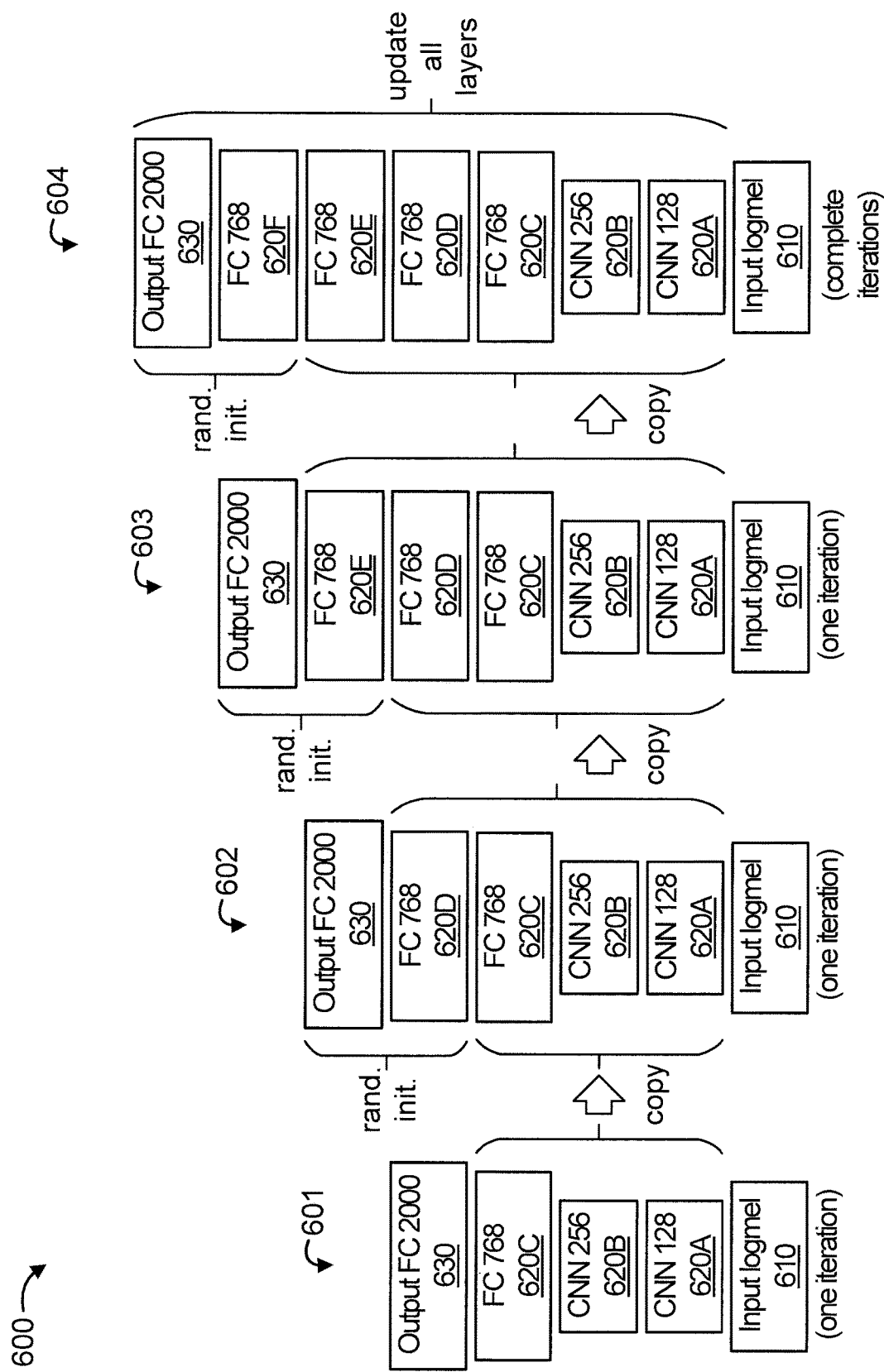
FIG. 6 is a block diagram showing a baseline neural network-based acoustic model training configuration to which the present invention can be applied, in accordance with an embodiment of the present invention.

FIG. 6 is a block diagram showing a baseline neural network-based acoustic model training configuration (hereinafter "baseline training configuration") 600 to which the present invention can be applied, in accordance with an embodiment of the present invention. That is, baseline training configuration 600 can be used to provide the previously completed model (such as previously completed model 300 of FIG. 3).

Initially, at block 601 corresponding to one iteration, the baseline training configuration 600 includes an input layer 610, a set of middle layers 620, and an output layer 630. The set of middle layers 630 includes a Convolutional Neural Network (CNN) layer 620A, a CNN layer 620B, a Fully Connected (FC) layer 620C. Each of the layers is further designated in FIG. 6 with an integer as a suffix. The integer represents the size (the number of units (e.g., leaves)) of a respective layer to which the integer corresponds.

At block 602, corresponding to one iteration, copy the set of middle layers 620 (currently including layers 620A, 620B, and 620C), add an FC layer 620D, and randomly initialize (rand. init.) the FC layer 620D and the output layer 630.

At block 603, corresponding to one iteration, copy the set of middle layers 620 (currently including layers 620A, 620B, 620C, and 620D), add an FC layer 620E, and randomly initialize the FC layer 620D and the output layer 6630.

At block 604, corresponding to a completion of the iterations, copy the set of middle layers 620 (currently including layers 620A, 620B, 620C, 620D, and 620E), add an FC layer 620F, randomly initialize the FC layer 620F and the output layer 630, and update all of the layers (layers 620A-F and 630) except the first/lowest layer 610 (since, for the purposes of the present invention, connections parameters between two adjacent layers are presumed to correspond to the upper layer of the two adjacent layers). It is to be noted that FC layer 620 is not the same size as output layer 630 in conventional configurations. This is in contrast to the training configurations 700, and 800 shown and described with respect to FIGS. 7, and 8 respectively.

It is to be appreciated that blocks 610, 620, 630, and 640 each involve different training iterations.

As noted above, the present invention can be considered to essentially include two primary training steps, hereinafter designated as step 1 and step 2 (corresponding to blocks 210 and 220 of method 200 of FIG. 2). Step 1 essentially involves building a well-trained acoustic model (e.g., in a usual way) but with minus-one layers (with respect to the desired number of target layers), and step 2 essentially involves putting an additional output layer on top of the first model (the one formed from step 1) to obtain a new model with the (desired) target number of layers. The additional output layer of the new model is the same size as the original output layer of the first model. As can be appreciated by one of ordinary skill in the art, step 1 can involve one or more iterations. All the connection parameters in the first model (of step 1) should be copied to the corresponding layer in the second model (of step 2). The old output-layer 330 is integrated into the middle layers and is connected to the new output-layer 440. The connections between them are randomly initialized. The second model can also be trained with one-hot teacher.

Figure 7:
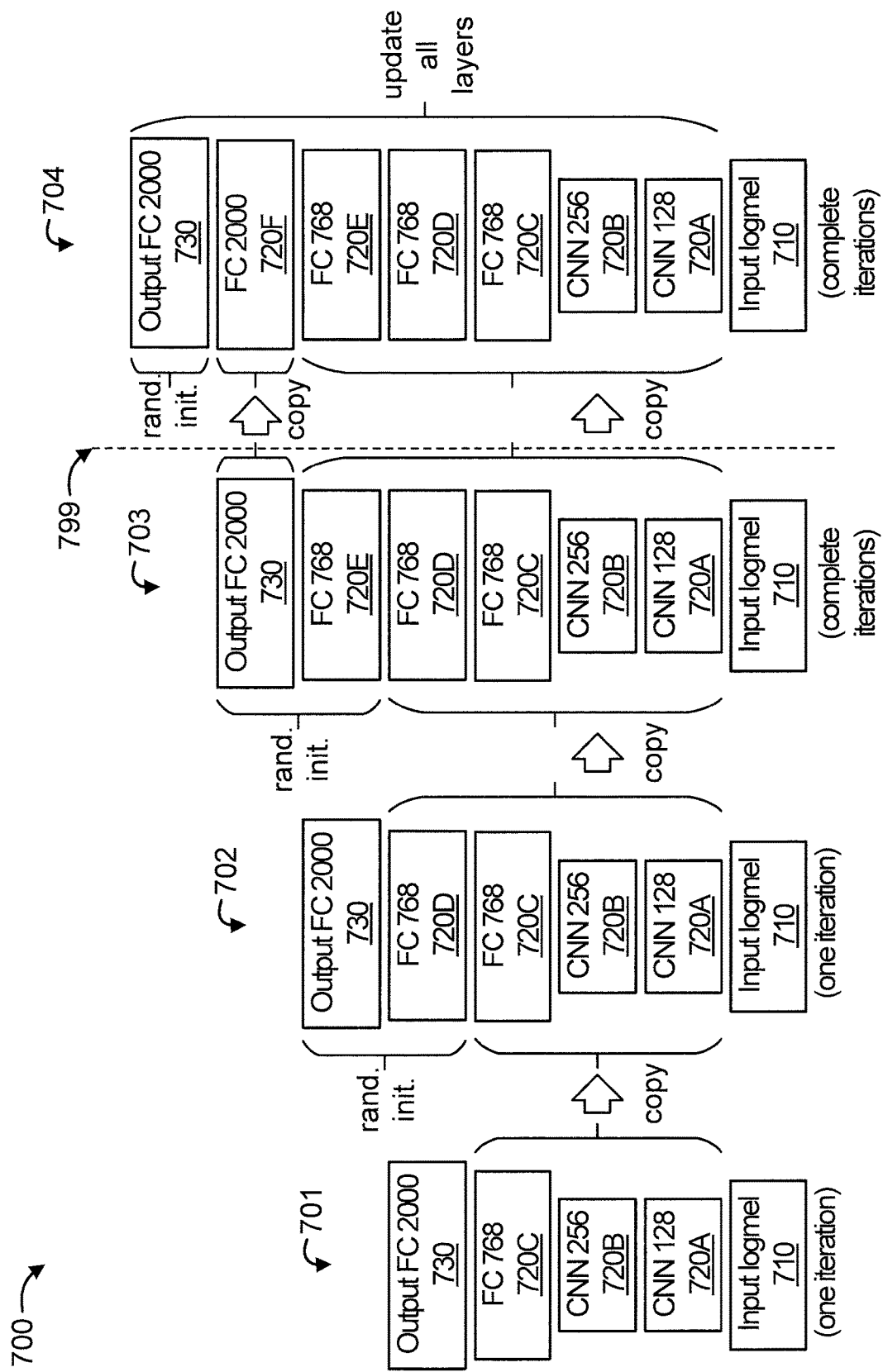
FIG. 7 is a block diagram showing a neural network-based acoustic model training configuration, in accordance with an embodiment of the present invention.
Figure 8:
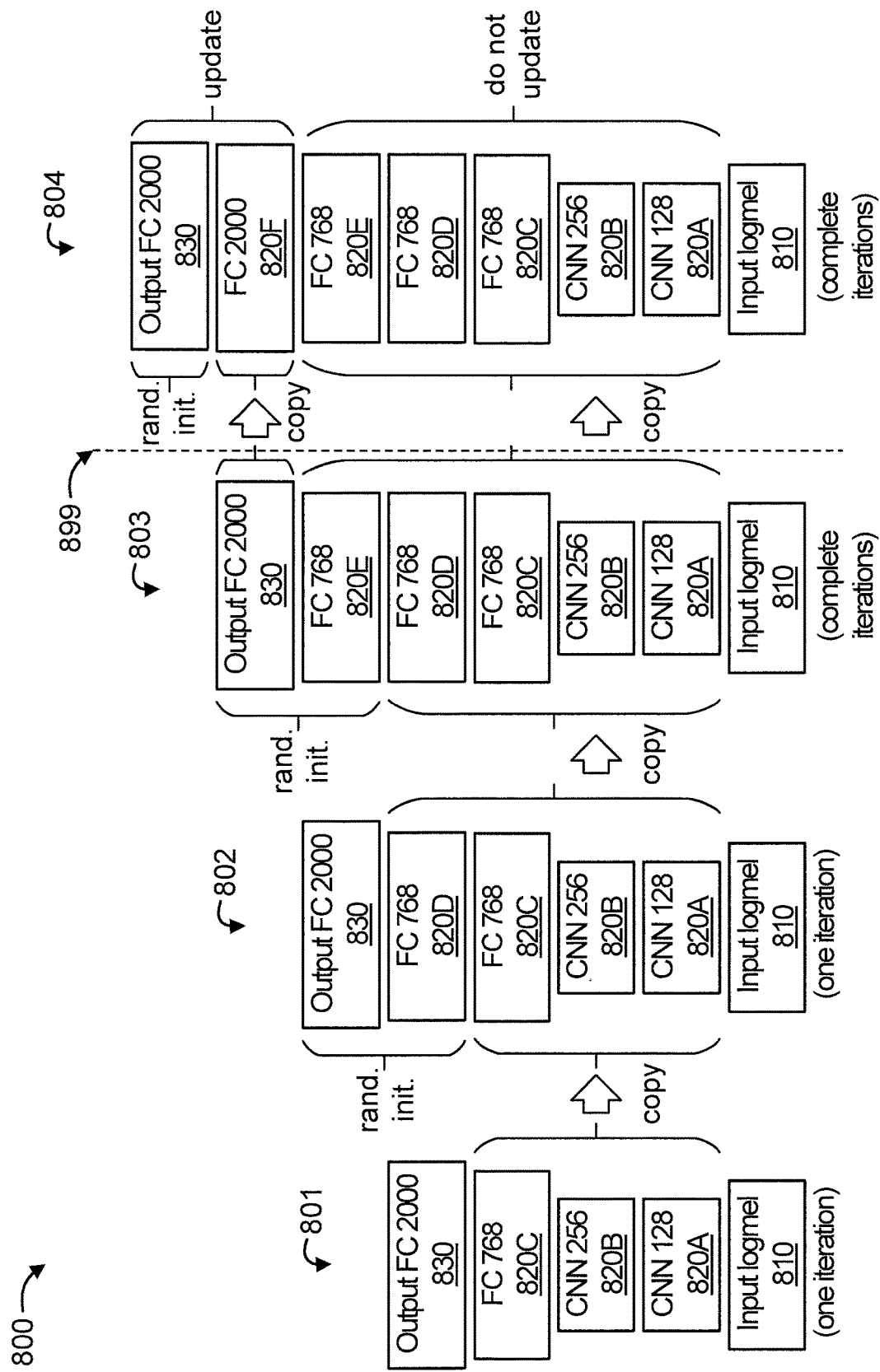
FIG. 8 is a block diagram showing another neural network-based acoustic model training configuration, in accordance with an embodiment of the present invention.

FIGS. 7-8 below relate to various training scenarios, in accordance with various embodiments of the present invention. In FIG. 7, all of the middle layers (except the first/lowest) are updated, while in FIG. 8 only the two top layers are updated with the other middle layers being frozen (fixed) during training.

FIG. 7 is a block diagram showing a neural network-based acoustic model training configuration (hereinafter "training configuration") 700, in accordance with an embodiment of the present invention. That is, training configuration 700 can be used to provide the new completed model (such as model 400 of FIG. 4). Training configuration 700 updates all of the middle layers of the new model.

Initially, at block 701, a baseline model is shown. The baseline model includes an input layer 710, a set of middle layers 720, and an output layer 730. In training configuration 700, the set of middle layers 730 includes a Convolutional Neural Network (CNN) layer 720A, a CNN layer 720B, and one or more Fully Connected (FC) layers 720C. However, in another embodiment, the set of middle layers 730 can all be CNN layers or all FC layers. These and other variations are readily contemplated by one of ordinary skill in the art, given the teachings of the present invention provided herein. Each of the layers is further designated in FIG. 7 with an integer as a suffix. The integer represents the size (the number of units) of a respective layer to which the integer corresponds.

At block 702, copy the set of middle layers 720 (currently including layers 720A, 720B, and 720C), add an FC layer 720D, and randomly initialize (rand. init.) the FC layer 720D and the output layer 730.

At block 703, copy the set of middle layers 720 (currently including layers 720A, 720B, 720C, and 720D), add an FC layer 720E, and randomly initialize the FC layer 720E and the output layer 730.

At block 704, corresponding to the new (final) model, copy the set of middle layers 720 (currently including layers 720A, 720B, 720C, 720D, and 720E), add an FC layer 720F which should be copied from 730 (in 703 configuration) as an old output layer. A new output layer 730 (in 704 configuration) having the same size (number of units) as the old output layer 720F, should be randomly initialized. Also, update all of the layers 720A-F and 730. The dotted line 799 indicates a demarcation between the first model after training (wherein the first model is completely trained) and the new model with the new output layer. Further regarding block 704, for the purposes of the present invention, connections parameters between two adjacent layers are presumed to correspond to the upper layer of the two adjacent layers. Hence, that is why only layers 720A-720F and 730 (and not layer 710) are shown as being updated.

FIG. 8 is a block diagram showing another neural network-based acoustic model training configuration (hereinafter "training configuration") 800, in accordance with an embodiment of the present invention. That is, training configuration 800 can be used to provide the new completed model (such as model 400 of FIG. 4). Training configuration 800 corresponds to the final (new) model training, where only the two top layers are updated and the other layers (i.e., the other middle layers) are not updated but instead are frozen in the training.

Initially, at block 801, a baseline configuration is shown. The baseline configuration includes an input layer 810, a set of middle layers 820, and an output layer 830. The set of middle layers 830 includes a Convolutional Neural Network (CNN) layer 820A, a CNN layer 820B, and one or more Fully Connected (FC) layers 820C. However, in another embodiment, the set of middle layers 830 can all be CNN layers or all FC layers. These and other variations are readily contemplated by one of ordinary skill in the art, given the teachings of the present invention provided herein. Each of the layers is further designated in FIG. 8 with an integer as a suffix. The integer represents the size (the number of units) of a respective layer to which the integer corresponds.

At block 802, copy the set of middle layers 820 (currently including layers 820A, 820B, and 820C), add an FC layer 820D, and randomly initialize (rand. init.) the FC layer 820D and the output layer 830.

At block 803, copy the set of middle layers 820 (currently including layers 820A, 820B, 820C, and 820D), add an FC layer 820E, and randomly initialize the FC layer 820E and the output layer 830.

At block 804, corresponding to the new (final) model, copy the set of middle layers 820 (currently including layers 820A, 820B, 820C, 820D, and 820E), add an FC layer 820F which should be copied from 830 (in 803 configuration) as an output layer. A new output layer 830 (in 804 configuration) having the same size (number of units) as the output layer 830, should be randomly initialized. Update layers 820F and 830 only. The dotted line 899 indicates a demarcation between the first model after training (wherein the first model is completely trained) and the new model with the new output layer. Layers 820A-820E are shown as not being updated, because these layers are considered as fully trained already.

A brief description will now be given regarding discriminative pretraining that can be used for acoustic modeling pretraining to provide pretrained model 300.

A discriminative pretraining technique pretrains hidden layers of a neural network (e.g., a deep neural network). In general, a one-hidden-layer neural network is trained first using labels discriminatively with error backpropagation (BP). Then, after discarding an output layer in the previous one-hidden-layer neural network, another randomly initialized hidden layer is added on top of the previously trained hidden layer along with a new output layer that represents the targets for classification or recognition. The resulting multiple-hidden-layer is then discriminatively trained using the same strategy, and so on until the desired number of hidden layers is reached. This produces a pretrained DNN. The discriminative pretraining technique has the advantage of bringing the DNN layer weights close to a good local optimum, while still leaving them in range with a high gradient so that they can be fine-tuned effectively.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
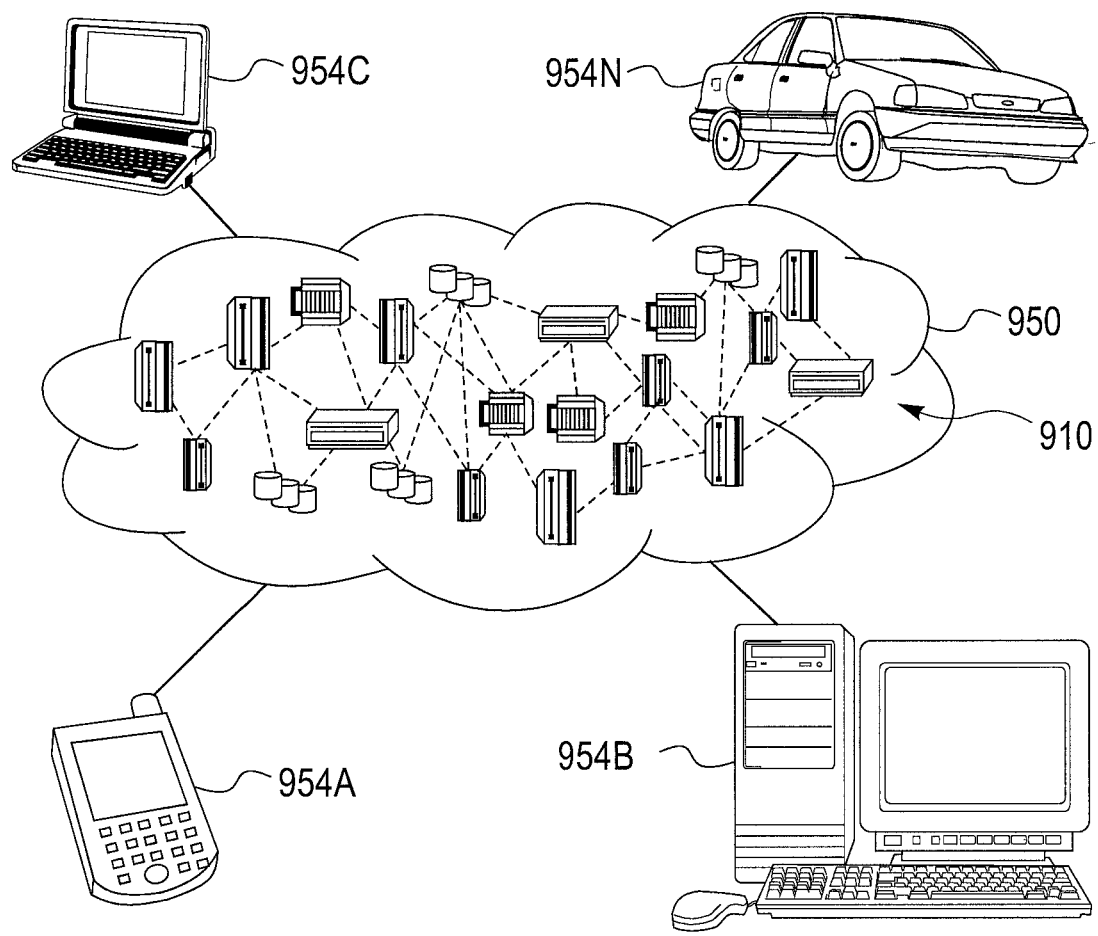
FIG. 9 is a block diagram showing an illustrative cloud computing environment having one or more cloud computing nodes with which local computing devices used by cloud consumers communicate in accordance with one embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
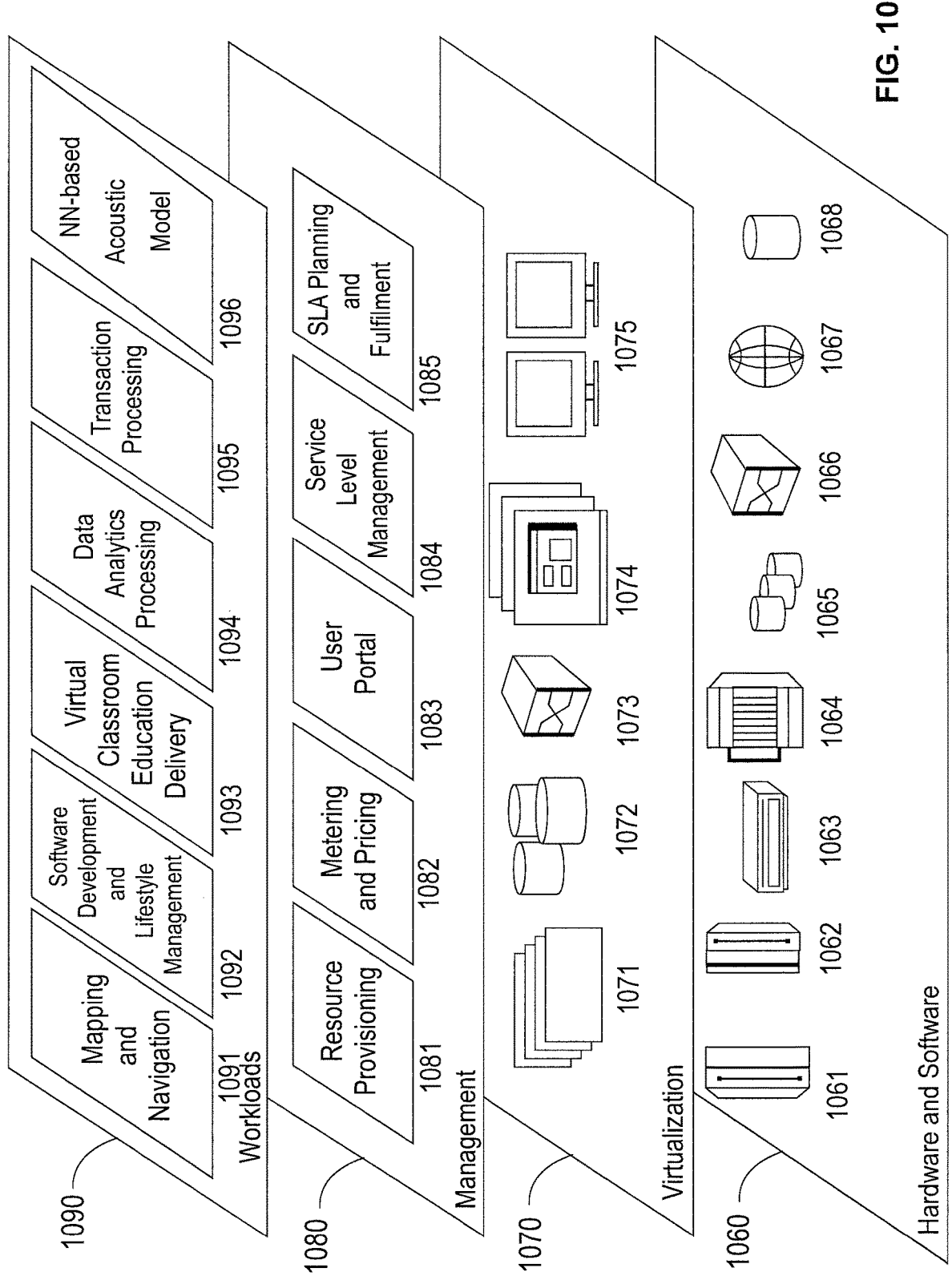
FIG. 10 is a block diagram showing a set of functional abstraction layers provided by a cloud computing environment in accordance with one embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and Neural Network-based (NN-based) acoustic model with softening target-layer 1096.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for training a neural network-based (NN-based) acoustic model, comprising:
   receiving, by a processor, the neural network-based (NN-based) acoustic model, trained by a one-hot scheme and having an input layer, a set of middle layers, and an original output layer, at least each of the middle layers subsequent to a first one of the middle layers having trained parameters;
   stacking, by the processor, a new output layer on the original output layer of the NN-based acoustic model to form a new NN-based acoustic model, the new output layer having a same size as the original output layer; and
   retraining, by the processor, only the new output layer and the original output layer of the new NN-based acoustic model in the one-hot scheme, with the trained parameters of middle layers subsequent to at least the first one of the middle layers being fixed,
   wherein the new output layer is configured to operate as a translation layer between one-hot targets and soft targets.

2. The computer-implemented method of claim 1, wherein the NN-based acoustic model is trained using a multi-iteration training technique.

3. The computer-implemented method of claim 1, wherein the NN-based acoustic model is trained using a multi-iteration discriminative pretraining technique.

4. The computer-implemented method of claim 1, wherein the translation layer is configured to mitigate inconsistency between one-hot training and one-hot testing by translating between the one-hot targets and the soft targets.

5. The computer-implemented method of claim 1, wherein the trained parameters of the original output layer are used as initial values for the original output layer, and random initial values are used for the new output layer.

6. The computer-implemented method of claim 1, further comprising iteratively adding a respective new middle layer to the set of middle layers at each iteration in a set of multiple training iterations.

7. The computer-implemented method of claim 6, wherein said iteratively adding comprises randomly initializing the respective new middle layer responsive to adding the respective new middle layer to the set of middle layers at each of the iterations in the set of multiple training iterations.

8. The computer-implemented method of claim 7, wherein said iteratively adding further comprises randomly initializing the new top layer together with the respective new middle layer responsive to adding the new middle layer to the set of middle layers at each of the iterations in the set of multiple training iterations.

9. The computer-implemented method of claim 1, further comprising translating, using the new NN-based acoustic mode, one or more one-hot targets from the original output layer to one or more soft targets in the new output layer.

10. A computer program product for training a neural network-based (NN-based) acoustic model, the computer program product comprising a non-transitory computer readable storage medium having program instructions embodied therewith, the program instructions executable by a computer to cause the computer to perform a method comprising:
   receiving, by the processor, the neural network-based (NN-based) acoustic model, trained by a one-hot scheme and having an input layer, a set of middle layers, and an original output layer, at least each of the middle layers subsequent to a first one of the middle layers having trained parameters;
   stacking, by the processor, a new output layer on the original output layer of the NN-based acoustic model to form a new NN-based acoustic model, the new output layer having a same size as the original output layer; and
   retraining, by the processor, only the new output layer and the original output layer of the new NN-based acoustic model in the one-hot scheme, with the trained parameters of middle layers subsequent to at least the first one of the middle layers being fixed,
   wherein the new output layer is configured to operate as a translation layer between one-hot targets and soft targets.

11. The computer program product of claim 10, wherein the N N-based acoustic model is trained using a multi-iteration training technique.

12. The computer program product of claim 10, wherein the NN-based acoustic model is trained using a multi-iteration discriminative pretraining technique.

13. The computer program product of claim 10, wherein the translation layer is configured to mitigate inconsistency between one-hot training and one-hot testing by translating between the one-hot targets and the soft targets.

14. The computer program product of claim 10, wherein the trained parameters of the original output layer are used as initial values for the original output layer, and random initial values are used for the new output layer.

15. The computer program product of claim 10, wherein the method further comprises iteratively adding a respective new middle layer to the set of middle layers at each iteration in a set of multiple training iterations.

16. The computer program product of claim 15, wherein said iteratively adding comprises randomly initializing the respective new middle layer responsive to adding the respective new middle layer to the set of middle layers at each of the iterations in the set of multiple training iterations.

17. The computer program product of claim 16, wherein said iteratively adding further comprises randomly initializing the new top layer together with the respective new middle layer responsive to adding the new middle layer to the set of middle layers at each of the iterations in the set of multiple training iterations.

18. A computer processing system for training a neural network-based (NN-based) acoustic model, comprising:
   a memory for storing program code; and
   a processor, operatively coupled to the memory, for running the program code to
      receive the neural network-based (NN-based) acoustic model, trained by a one-hot scheme and having an input layer, a set of middle layers, and an original output layer, at least each of the middle layers subsequent to a first one of the middle layers having trained parameters;
      stack a new output layer on the original output layer of the NN-based acoustic model to form a new NN-based acoustic model, the new output layer having a same size as the original output layer; and retrain only the new output layer and the original output layer of the new NN-based acoustic model in the one-hot scheme, with the trained parameters of middle layers subsequent to at least the first one of the middle layers being fixed, wherein the new output layer is configured to operate as a translation layer between one-hot targets and soft targets.

* * * * *